United States Patent [19]

Fasano

[11] 4,260,049
[45] Apr. 7, 1981

[54] DEVICES FOR AUTOMATIC WEAR COMPENSATION IN MOTOR VEHICLE FRICTION CLUTCH OPERATING MECHANISMS

[75] Inventor: Osvaldo Fasano, Villarbasse, Italy

[73] Assignee: START S.p.A. - Studi Apparecchiature Ricercne Techniche, Turin, Italy

[21] Appl. No.: 10,445

[22] Filed: Feb. 8, 1979

[30] Foreign Application Priority Data

Apr. 28, 1978 [IT] Italy ................................ 67974 A/78

[51] Int. Cl.³ ............................................. F16D 13/75
[52] U.S. Cl. ............................... 192/111 A; 188/196 B
[58] Field of Search ....................... 192/111 R, 111 A; 188/196 B

[56] References Cited

U.S. PATENT DOCUMENTS 3,250,357 5/1966 Zeidler ............................. 192/111 A

FOREIGN PATENT DOCUMENTS 1411467 10/1975 United Kingdom ................. 192/111 A Primary Examiner—C. J. Husar
Assistant Examiner—Conrad Berman
Attorney, Agent, or Firm—Sughrue, Rothwell, Mion, Zinn & Macpeak

[57] ABSTRACT

A device which automatically compensates for wear of a motor vehicle friction clutch by the engagement, during a working stroke, of a pawl or knurled element co-operating with a locking arm, with a toothed surface or knurling on a first link, and subsequent disengagement of said pawl upon the return stroke of a rocker arm due to the abutment of a stop with a second link which allows the first link to rotate out of engagement with the pawl, a spring biasing the links together and allowing the pawl to engage the first link in a wear-compensating position prior to the next working stroke.

7 Claims, 6 Drawing Figures

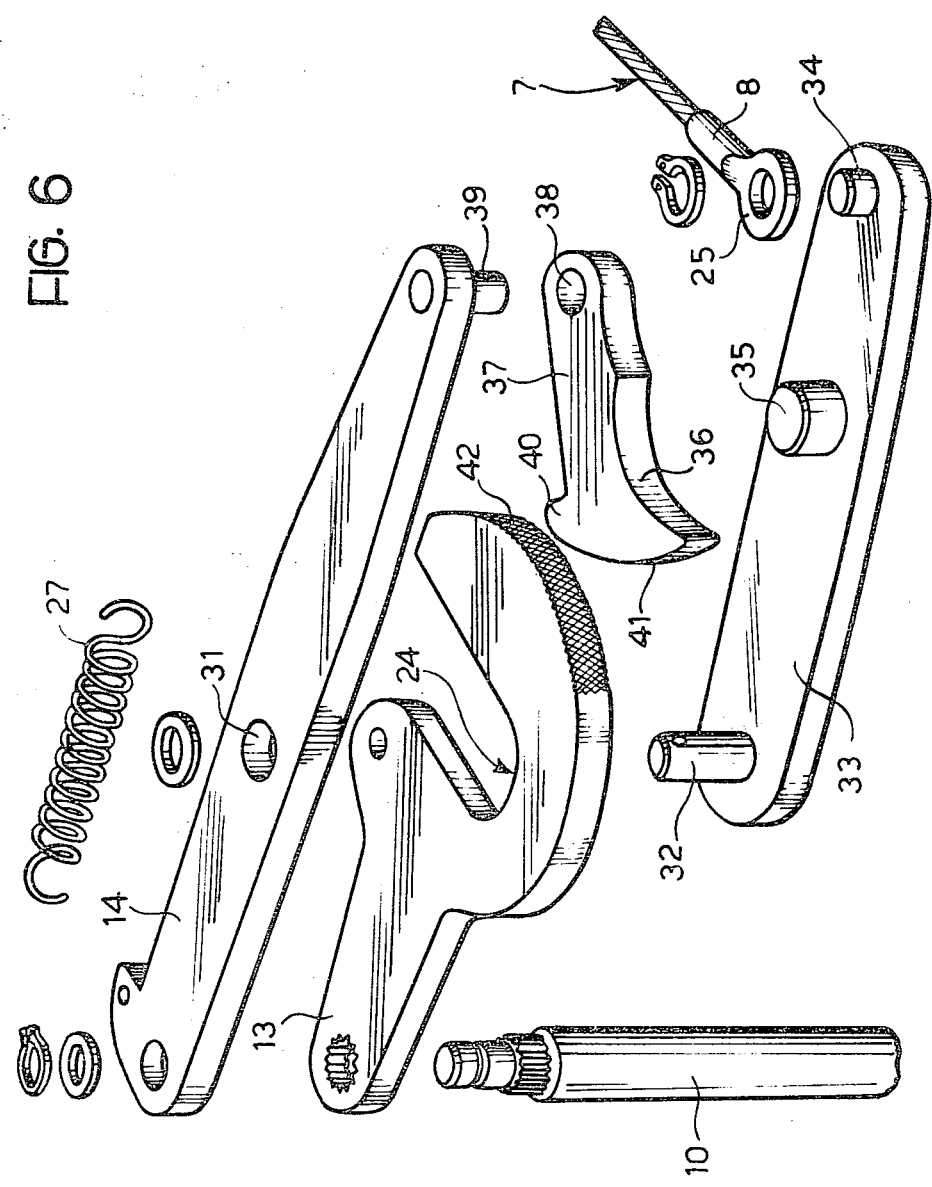

DEVICES FOR AUTOMATIC WEAR COMPENSATION IN MOTOR VEHICLE FRICTION CLUTCH OPERATING MECHANISMS

The present invention relates to devices for automatic wear compensation in motor vehicle friction clutch operating mechanisms.

More particularly, the invention is applicable to automatic wear compensation in motor vehicle friction clutch operating mechanisms of the type comprising a movable control lever articulated to a fixed part of the vehicle and operable by a driver of the vehicle, a rocker arm, pivoted to a fixed part of the vehicle and having an angular position which is related to a displacement of a co-operating movable collar which controls disengageable of the friction clutch, and a tension element which interconnects a part of the rocker arm and a part of the control lever and which, during a working stroke of the mechanism, causes a rotation of the rocker arm with a consequent displacement of the movable collar in a direction which effects disengagement of the clutch.

A problem generally associated with known mechanisms of the aforesaid type is that of compensating for the play due to wear of the relatively slidable friction surfaces which are in contact with one another when the clutch is engaged.

The object of the present invention is to provide a friction clutch operating mechanism of the above specified type with a wear compensation device which is of simple construction and reliable operation, and which is capable of maintaining substantially constant the working stroke of the control lever necessary for disengagement of the clutch.

According to the present invention, there is provided a device for automatic wear compensation in a motor vehicle friction clutch operating mechanism, including a movable control lever articulated to a fixed part of the vehicle and operable by a driver of the vehicle, a rocker arm pivoted to a fixed part of the vehicle and having an angular position which is related to a displacement of a co-pending movable collar which controls disengagement of the friction clutch, and a tension element which interconnects a part of the rocker arm and a part of the control lever and which during a working stroke of the mechanism, causes a rotation of the rocker arm with a consequent displacement of the movable collar in a direction which effects disengagement of the clutch. The rocker arm comprises a first rigid element pivoted to the fixed part of the vehicle, a second rigid element pivoted to the said first element about a pivot axis which is substantially parallel to the pivot axis of the first element to the fixed part, and a locking arm movable by the tension element during the working stroke and pivoted to the second element about a pin, the axis of which is substantially parallel to the said pivot. Locking means are pivoted between the locking arm and the first element for preventing rotation of the first element relative to the locking arm when the rocker arm is rotated, during the working stroke, by the action of the tension element, while allowing rotation of the first element in the opposite direction relative to the locking arm. Resilient means are provided connecting the first and second elements and biasing the second element towards the first element when the latter moves in said opposite direction to maintain locking of the locking means and fixed stop means co-operating with the second element to limit, at a predetermined value, the angular displacement of said second element in the said opposite direction, so that the first element can assume a wear compensating position relative to the second element in the rest position of the control lever.

The device of the present invention effects automatic wear compensation using an operating mechanism of simple construction. As a result, the progressive wear of the clutch surfaces does not lead to any significant change in the movement of the clutch pedal needed to disengage the clutch.

The invention will now be more particularly described, by way of example, with reference to the accompanying drawings, in which:

FIG. 6 is an exploded perspective view corresponding to FIG. 3 of the variant shown in FIG. 5.

Figure 1:
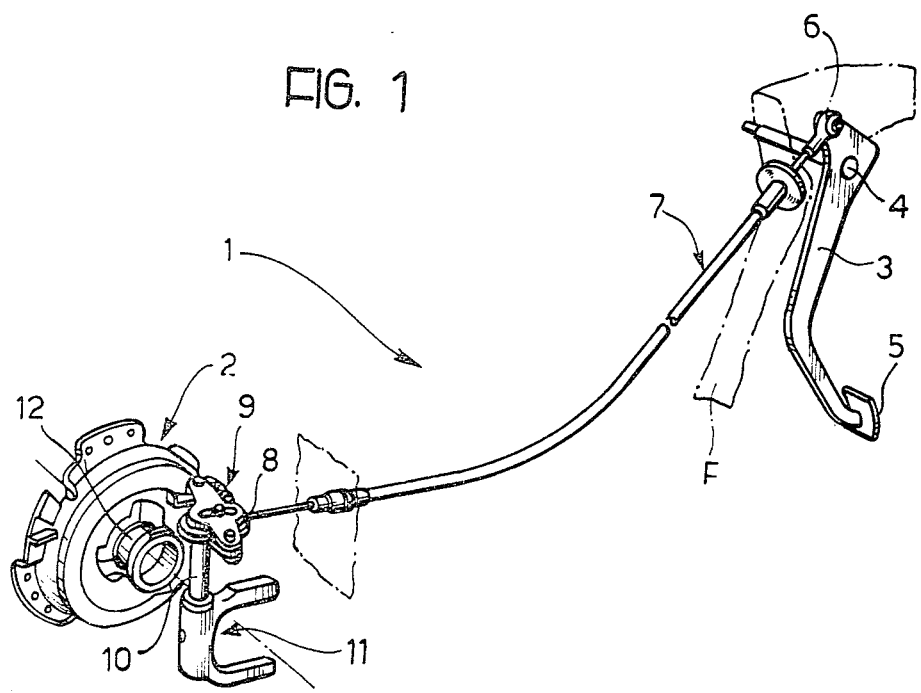
FIG. 1 is a diagrammatic perspective view illustrating a clutch-operating mechanism incorporating a wear compensation device according to one embodiment of the invention.

Referring to the drawings, a clutch-operating mechanism, generally indicated 1, controls the disengagement of a friction clutch 2 of a motor vehicle. The mechanism 1 includes a movable control lever 3 which is articulated to a fixed part F (shown in ghost outline in FIG. 1) of the vehicle by a pivot pin 4. The lever 3 has at one of its ends a clutch pedal 5 to which a driver of the vehicle applies an operating force for disengaging the clutch. At its other end, the lever 3 is provided with a pivot pin 6 for the attachment of one end of a tension element 7, comprising the core of a known Bowden cable. The tension element 7 is pivotally anchored at its opposite end 8 to a rocker arm 9 which at one end is articulated to the body of the vehicle by a shaft 10. The opposite end of the shaft 10 carries a fork 11 which controls, in a known manner, the displacement of a co-operating movable collar 12, which, by operating against the action of resilient means (not shown) in the clutch 2, controls, also in a known manner, the disengagement of the clutch 2. The sheath of the Bowden cable tensioning element 7 is fixed at opposite ends to the vehicle body, in the usual way.

Figure 3:
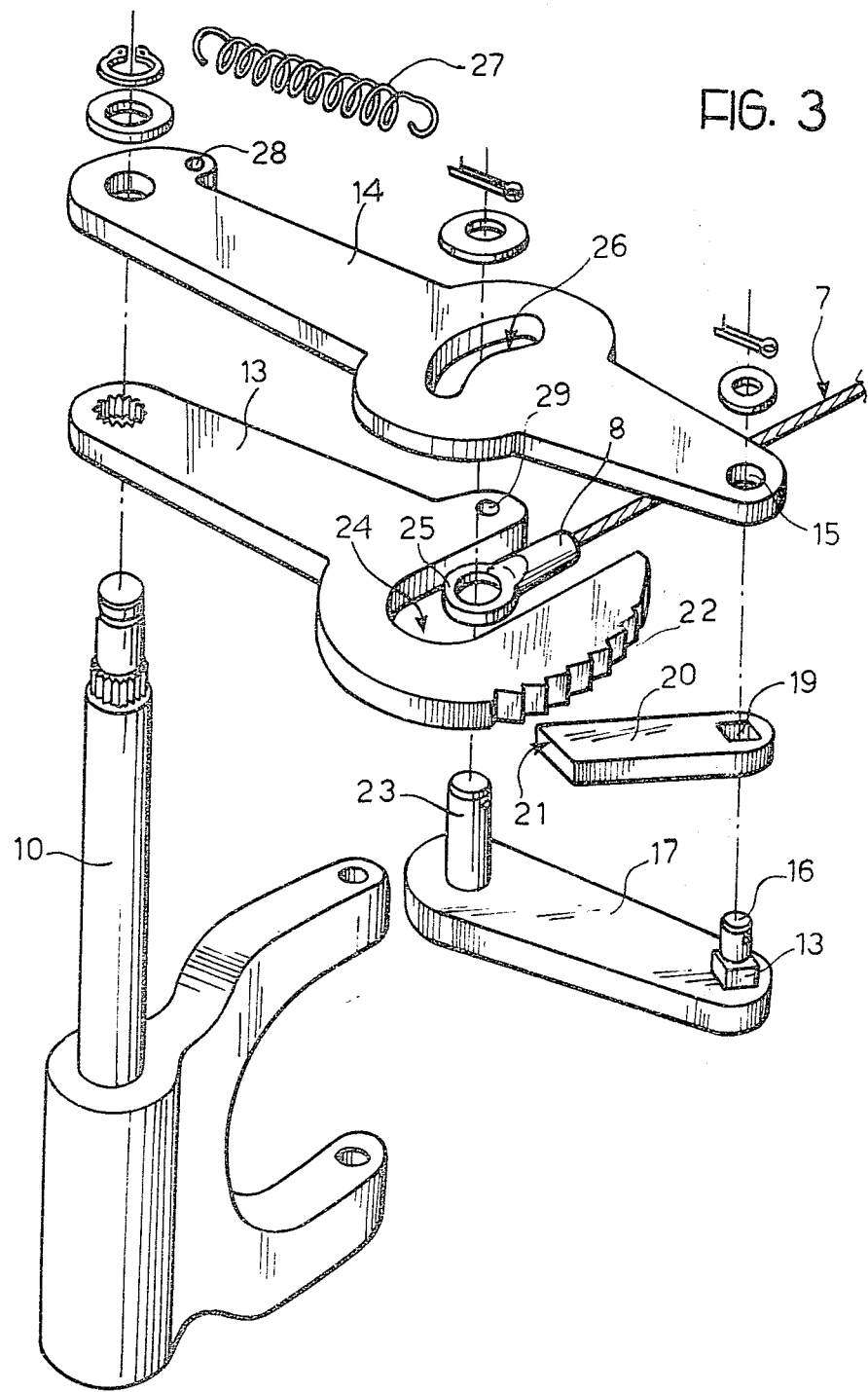
FIG. 3 is an exploded perspective view of the device shown in FIG. 2.
Figure 4:
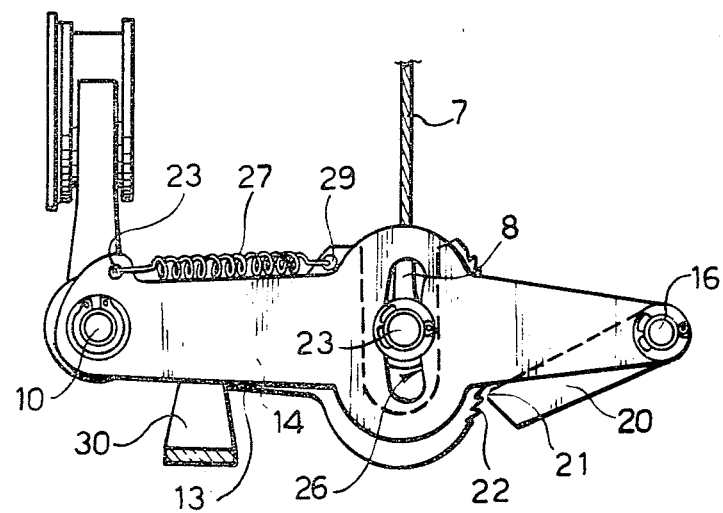
FIG. 4 is a plan view of the device shown in FIG. 2.

The rocker arm 9 comprises a first rigid element, formed by a first link 13, which at one of its ends is keyed to the shaft 10 for rotation with the latter, and a second rigid element, formed by a second link 14, which is articulated at one of its ends to the shaft 10. The opposite end of the second link 14 has a hole 15 within which is rotatably housed a pin 16 carried by a locking arm 17, as shown in FIG. 3. The pin 16 is substantially parallel to the shaft 10 and has a square base 18 which engages in a square hole 19 at one end of an arrestor element 20.

Figure 2:
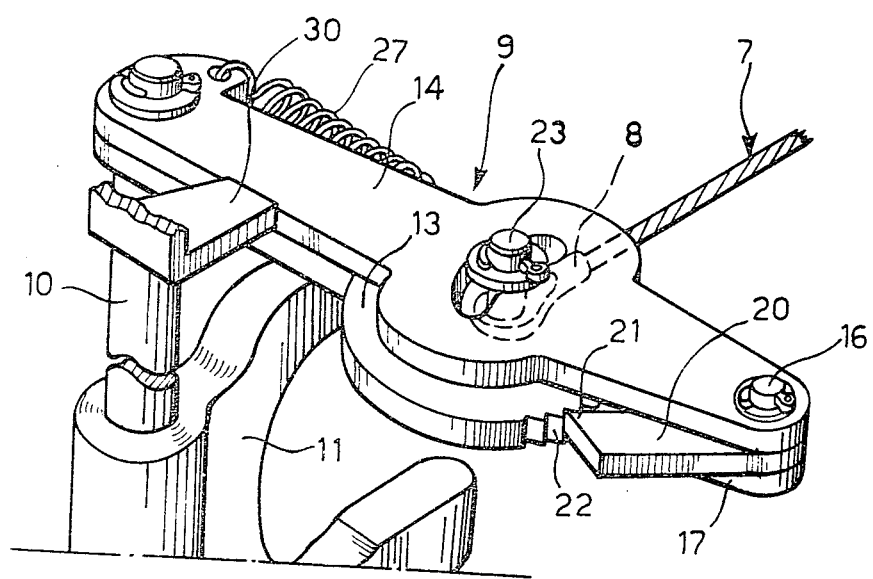
FIG. 2 is a perspective view on an enlarged scale of the wear compensation device shown in FIG. 1.

The arrestor element 20 has at its opposite end a first locking element, formed by a pawl 21, which engages a co-operating second locking element formed by an arcuate toothed surface 22 on the facing edge of the free end of the first link 13. The arcuate toothed surface 22 is centered on the axis of the shaft 10 and is preferably formed with ratchet teeth (FIG. 2). Rotation of the locking arm 17, and the consequent engagement of the pawl 21 within the toothed surface 22, is controlled by the end 8 of the tension element 7, which is provided with a terminal eyelet 25, housed within a recess 24 in the first link 13. The eyelet 25 is rotatably engaged with a pin 23 carried by the locking arm 17 at its end opposite the pin 16. The free end of the pin 23 is slidable within an arcuate slot 26 in the second link 14. Resilient means, comprising a tension spring 27, is anchored at one end in a hole 28 in the second link 14 adjacent the shaft 10, and, at its opposite end, in a hole 29 in the first link 13 adjacent the end 8 of tension element 7. A fixed stop means 30 limits, within a predetermined range, the movement of the second link 14 in a direction opposed to the action of the tension element 7.

The mechanism 1 operates as follows: the driver depresses the pedal 5 to effect a working stroke of the control lever 3, tensioning the tension element 7. This effects a locking of the link 13, 14 of the rocker arm 9 with each other by the engagement of the pawl 21 with the toothed surface 22, the engagement being maintained by the spring 27. The links 13, 14 of the rocker arm are rotated by the continued movement of the control lever 3, rotating the shaft 10 and, consequently, the fork 11. During this rotation, the rocker arm 9 moves away from the stop 30 and the fork 11 displaces the movable collar 12 against the action of the resilient means in the clutch 2 which normally maintain the sliding parts of the clutch 2 in contact, to separate the sliding parts and effect disengagement of the clutch 2.

When the driver lifts his foot from the clutch pedal 5 the tension element 7 relaxes and the resilient means in the clutch 2 push the collar 12 back, in a return stroke, causing rotation of the fork 11 and the rocker arm 9 in a direction opposite that described above and engaging the clutch. The rocker arm 9 rotates until it abuts the stop 30. The stop 30 acts only on the second link 14, however, leaving the first link 13 free to rotate further. If, as a result of wear to the sliding friction surfaces of the clutch, the return movement of the collar 12 increases, the first link 13 will rotate, relative to the second link 14, through a progressively increasing angle as wear proceeds, such relative rotation being accompanied by movement of the ratchet toothed surface 22 relative to the pawl 21, until the additional movement of the collar 12 due to the clutch wear has been taken up. The pawl 21 will then be re-engaged with the toothed surface 22 to maintain the new relative angular position of the links 13, 14 during a subsequent working stroke, the spring 27 effectively locking the links 13, 14 together to prevent further slippage of the pawl 21 on the toothed surface 22.

Thus the working stroke of the control lever 3 remains practically unaltered during the lifetime of the clutch 2, independently of the degree of wear of the relatively slidable friction surfaces of the clutch 2.

In the embodiment illustrated in FIGS. 5 and 6, the elements corresponding to those previously described with reference to FIGS. 1 to 4, have the same reference numerals. In this embodiment the second link 14 is provided with a central hole 31 in which there is rotatably located a pin 32 carried at one end of a locking arm 33. The arm 33 has a corresponding function to the locking arm 17, and is provided at its opposite end with a pin 34. The pin 34 engages the terminal eyelet 25 at the end 8 of the tension element 7. The locking arm also has, between its ends, an upstanding stud 35, extending in the same direction as the pins 32, 34, which is adapted to co-operate with an adjacent surface 36 of an arrestor element 37. The arrestor element 37 is pivotally mounted by means of a hole 38 at one of its ends, fitting onto a pin 39 carried at the end of the second link 14 opposite the shaft 10. The pin 39 and the shaft 10 are substantially parallel to each other. The arrestor element 37 has at its opposite end a first locking element formed by an enlarged part 40 having a knurled edge 41. The knurled edge 41 engages a cooperating second locking element, formed by an arcuate knurled surface 42 on the facing edge of the first link 13, the centre of the arcuate surface 42 coinciding with the axis of the shaft 10.

Figure 5:
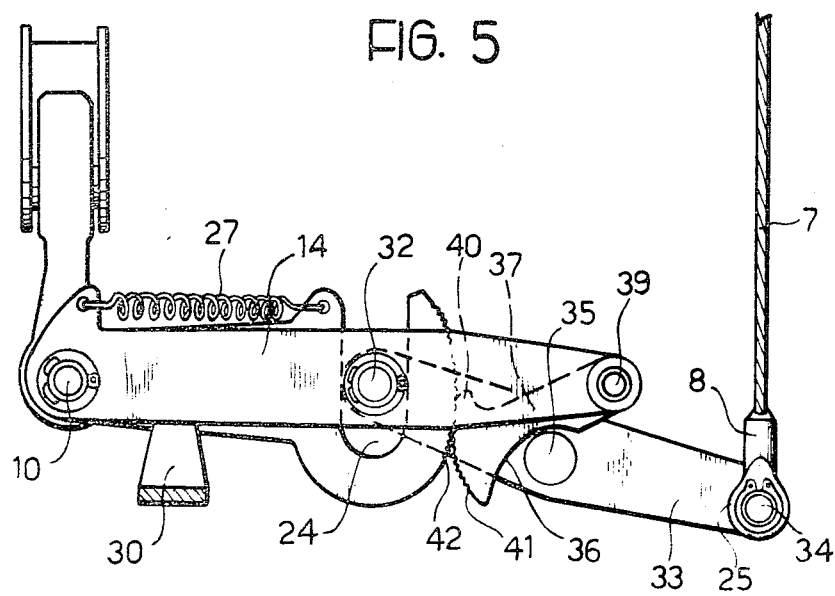
FIG. 5 is a plan view, corresponding to FIG. 2, of a variant of the device shown in FIG. 2.

The operation of the embodiment of FIGS. 5 and 6 is substantially the same as that previously described. The driver, acting on the tension element 7 through the clutch pedal 5, causes a rotation of the locking arm 33 which effects engagement of the knurled edge 41 of the arrestor element 37 with the knurled surface 42. In this way the locking arm 33, the first link 13 and the second link 14, are locked together to form the rocker arm 9 which rotates the shaft 10 and the fork 11 to effect disengagement of the clutch 2. The wear of the clutch is compensated on the return stroke in the manner previously described, by the differential rotation of the first and second links 13, 14 and the subsequent re-engagement of the edge 41 of the arrestor element 37 further along the knurled surface 42 when the clutch pedal has returned to its rest position.

What is claimed is:

1. In a motor vehicle friction clutch operating mechanism comprising:
   a movable control lever articulated to said vehicle and operable by a driver of said vehicle to effect a working stroke for clutch disengagement;
   a rocker arm pivoted to said vehicle;
   a movable collar co-operating with said rocker arm to control disengagement of said friction clutch by effecting a displacement which is related to an angular position of said rocker arm, and
   a tension element interconnecting said rocker arm and said control lever and which, during a said working stroke, causes a rotation of said rocker arm with a consequent displacement of said movable collar in a direction which effects disengagement of said clutch,
   a device for automatic wear compensation, wherein the improvements consist in:
   said rocker arm comprising a first rigid element pivoted to said vehicle; a second rigid element; and a pivot connecting said elements which is substantially parallel to said pivot axis of said first element to said vehicle;
   a locking arm movable by said tension element during a said working stroke;
   a pivot connecting said locking arm with said second element for pivotal movement about an axis substantially parallel to said pivot axes;
   locking means between said locking arm and said first element preventing rotation of said first element relative to said locking arm when said rocker arm is rotated, during a said working stroke, by the action of said tension element while allowing rotation of said first element in an opposite direction relative to said locking arm;
   resilient means connecting said first and second elements and biassing said second element towards said first element when said first element moves in said opposite direction to maintain locking of said locking means; and fixed stop means co-operating with said second element to limit, at a predetermined value, an angular displacement of said second element in said opposite direction, so that said first element can assume a wear-compensating position relative to said second element in a rest position of said control lever.

2. Device as defined in claim 1, wherein said pivot axis of said first element relative to said vehicle is co-axial with said pivot axis of said second element relative to said first element.

3. Device as defined in claim 1, wherein said locking means between said locking arm and said first element comprise an arrestor element co-operating with said locking arm; a first locking element carried by said arrestor element; and a co-operating second locking element formed on said first rocker arm element.

4. Device as defined in claim 3, wherein said first locking element comprises a pawl carried by said arrestor element, and said second locking element comprises an arcuate toothed surface co-operating with said pawl.

5. Device as defined in claim 4, wherein said arrestor element is fixed to said locking arm.

6. Device as defined in claim 3, wherein said first locking element comprises a knurled edge of said arrestor element, and said second locking element comprises a co-operating knurled edge formed on said first rocker arm element.

7. Device as defined in claim 6, wherein said arrestor element is articulated to said second element, and said locking arm has a projection which, during said working stroke, engages said arrestor element and rotates said arrestor element to bring said co-operating knurled edges into locking engagement with each other.

* * * * *